United States Patent Office 3,224,208
Patented Dec. 21, 1965

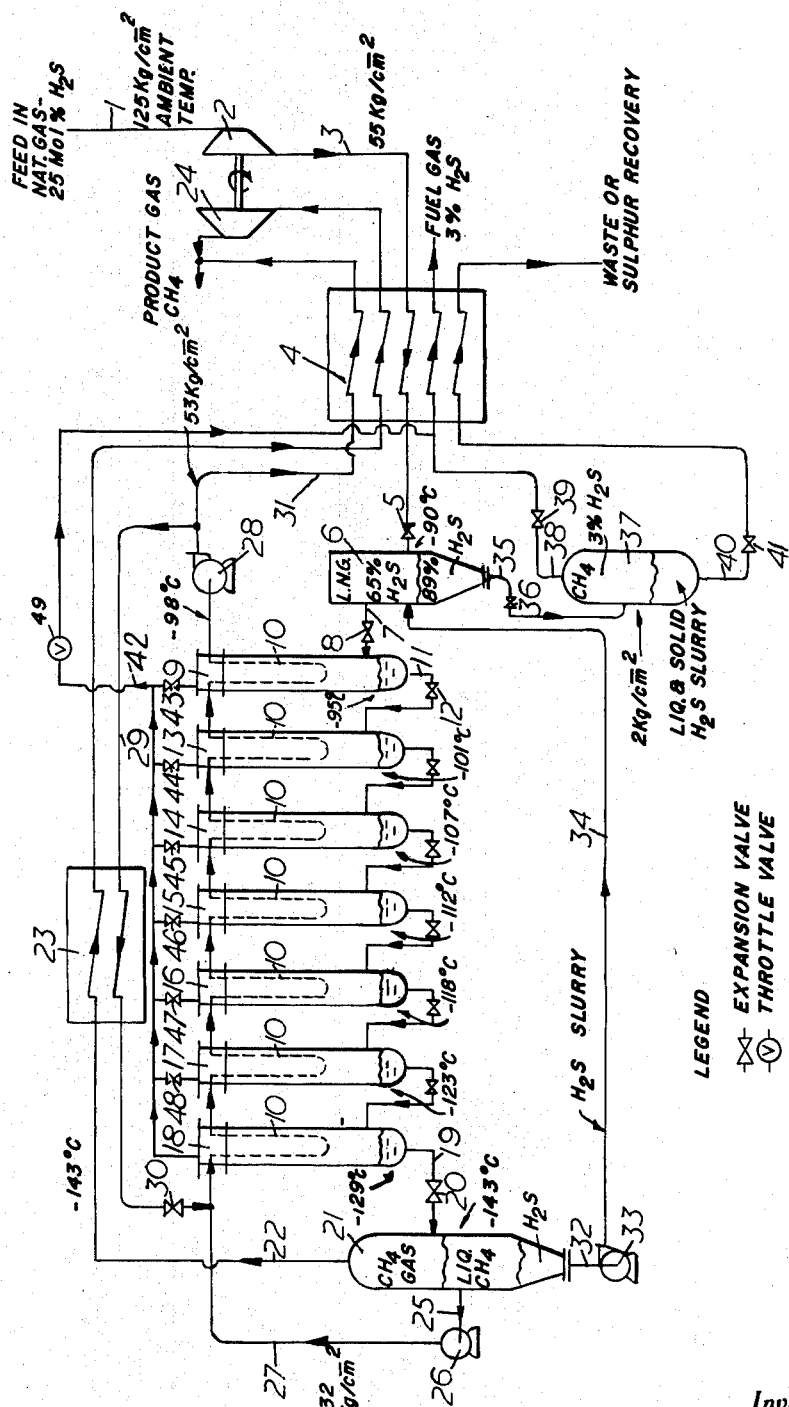

3,224,208
PURIFICATION OF NATURAL GASES
Etienne Maurice Schlumberger, London, England, and Hadi Hashemi-Tafreshi, Norman, Okla., assignors to Conch International Methane Limited, Nassau, Bahamas, a company of the Bahamas
Filed Nov. 24, 1961, Ser. No. 154,409
12 Claims. (Cl. 62—12)

This invention relates to the purification of gases containing contaminants which solidify when the gas is in the liquid state and is particularly concerned with the purification of natural gas containing hydrogen sulphide.

This invention concerns also the purification of a gas containing contaminants that are solidifiable when the gas is in the liquid state and contaminants having boiling points below the boiling point of the gas; and particularly concerns the purification of natural gas containing hydrogen sulphide and nitrogen.

It has already been proposed to separate hydrogen sulphide from methane by expanding liquid methane containing not more than 6 mol percent hydrogen sulphide to a temperature at which all or part of the hydrogen sulphide solidifies and separating the solid from the methane. It has also been proposed to cool a stream of methane containing more than 6 mol percent hydrogen sulphide while at a pressure of at least 32 kg./cm.$^2$ to a temperature sufficiently low to form two liquid phases, one of which is rich in methane and the other of which is rich in hydrogen sulphide, separating the two phases and recovering the methane from the methane-rich phase.

These processes involve problems of conserving the refrigeration potential of the cold liquids and vapours involved and concerned with the cooling and handling of solid phases, and this invention is directed to solving those problems.

Accordingly, the present invention provides a method of purifying a gas containing contaminants which will solidify when the gas is in the liquid state which comprises liquefying the gas under superatmospheric pressure and reducing its temperature to one short of the temperature at which the contaminants solidify, passing the liquefied gas to an expansion chamber operating at a pressure lower than the original pressure of the feed gas to cause a reduction in temperature so that a slurry of solid contaminants in the liquefied gas is formed accompanied by a flash-off of vapour, condensing the flashed-off vapour by heat exchange with cold purified liquefied gas and returning it to the slurry in the expansion chamber, passing the slurry of solid contaminants in liquefied gas from the expansion chamber to a separator operating at a pressure lower than the expansion chamber, passing cold purified liquefied gas from the separator in heat exchange with the flashed-off vapours from the expansion chamber to condense said vapours and then taking it off as product and withdrawing from the separator a concentrated slurry of the solid contaminants.

While the invention is primarily of use in removing hydrogen sulphide from natural gas, any carbon dioxide in the natural gas will be removed along with the hydrogen sulphide. It is also possible to use the invention for removing carbon dioxide from natural gas when it is the sole contaminant or removing carbon dioxide or hydrogen sulphide from other gases provided that the gas concerned can be converted to a liquid when the carbon dioxide or hydrogen sulphide is solid. Thus, for example, the invention may be used for separating carbon dioxide, hydrogen sulphide or water from air, coal gas, producer gas, synthesis gas, hydrogen or helium.

Generally, the liquefied gas will be passed through two or more expansion chambers in series prior to passing to the separator. Each of these expansion chambers will operate at a lower pressure than the previous one. This device provides a means of cooling the liquefied gas down to a low temperature while it contains solidified contaminants without having to pass it through a heat exchanger where the solid contaminants would cause difficulties by lowering its efficiency and possibly eventually blocking it with solid. The vapours produced in each expansion chamber are preferably condensed with the upper part of the expansion chamber itself by means of heat exchanger tubes carrying pure liquefied gas produced in the process. Alternatively, the vapours may be taken out of the expansion chamber, passed in heat exchange with the cold purified liquefied gas to condense them and then returned to the expansion chamber.

When applying the invention to a natural gas stream containing less than 7 mol percent of hydrogen sulphide, the natural gas may be liquefied and passed straight to the first expansion chamber without any loss of efficiency. However, if the natural gas stream contains 7 or more mol percent of hydrogen sulphide, then when it is liquefied under pressure, two liquid phases are formed, one rich in methane and the other rich in hydrogen sulphide, and it is more economical to effect a separation of these two phases and to pass only the phase rich in methane to the expansion chamber or chambers. In other words, a substantial removal of $H_2S$ is achieved in liquid phase separation before the subsequent solid phase separation which takes place in the expansion chambers and separator.

Depending on the temperature and pressure conditions, when a natural gas containing more than 7 mol percent of hydrogen sulphide is liquefied, in addition to the two liquid phases referred to above, there may also be a gas phase. This may, of course, be taken off separately if so desired and not passed into the expansion chambers.

When processing a hydrogen sulphide-rich natural gas and separating the two liquid phases referred to above before passing to the expansion chambers, the concentrated slurry of solid hydrogen sulphide (which may contain solid carbon dioxide) in methane removed from the separator may be returned to the vessel in which the two liquid phases are separated. This assists in preserving the refrigeration potential of the concentrated slurry.

The hydrogen sulphide-rich liquid phase which is drawn off from the vessel in which the two liquid phases are separated may be treated to recover the small amount of methane present in the phase, usually about 10%. A simple manner of achieving this is to reduce the pressure on the hydrogen sulphide-rich liquid phase down to about atmospheric pressure when the methane will flash off to leave a slurry of substantially pure solid hydrogen sulphide (with perhaps some solid carbon dioxide) in liquid hydrogen sulphide. When the slurry from the separator is returned to the vessel in which the two liquid phases are separated, this slurry of solid hydrogen sulphide in liquid hydrogen sulphide will comprise the hydrogen sulphide effluent of the process and can be sent, for example, to a sulphur recovery unit.

The cold purified liquefied gas removed from the separator and heat exchanged against the flashed-off vapours in the expansion chambers may be used to assist in cooling the incoming feed stream as may be the gas phase issuing from the separator. In this way, the whole process may be self-supporting as regards refrigeration, and no external refrigeration is necessary once the process has been started.

A further modification in the treatment of the cold purified liquefied gas stream is to compress part of it after it has condensed the flashed-off vapours in the expansion chambers, cool it against cold vapours coming from the separator and return it to the purified liquefied gas stream leaving the separator before it is passed in heat exchange with the vapours in the expansion chambers.

When a number of expansion chambers are used, it is possible to take off solid contaminants between the expansion chambers, for example by placing a suitable centrifugal separator between two expansion chambers This, however, is not generally necessary, and it is simpler to pass the whole of the slurry forward to the next expansion chamber and finally to the separator.

If the gas to be purified according to the above mentioned method contains also contaminants having boiling points below the boiling point of the uncontaminated gas, the efficiency of the method is reduced owing to the accumulation of gaseous contaminants in the expansion chamber or chambers; for example, if a natural gas feedstock containing nitrogen and traces of helium were to be purified, gaseous nitrogen and helium would accumulate in the expansion chamber or chambers. It has been found that if the above mentioned method is modified by venting part of the gas produced in the expansion chamber or chambers, the modified method may be conveniently used to purify a gas containing contaminants that are solidifiable when the uncontaminated gas is in the liquid state and contaminants having boiling points below the boiling point of the uncontaminated gas without accumulation of gaseous contaminants in the expansion chamber or chambers. The vented gas contains the contaminants having boiling points below the boiling point of the uncontaminated gas, and it may, preferably after being used to assist in cooling incoming feedstock gas, be dealt with in any desired manner depending upon the nature of the contaminants; for example, if a natural gas feedstock containing a minor amount of nitrogen were to be purified, the vented gas would consist of gaseous nitrogen and a substantial amount of methane, which mixture could be used as a fuel.

Accordingly, the present invention includes also a method of purifying a gas containing contaminants that are solidifiable when the gas is in the liquid state and contaminants having boiling points below the boiling point of the gas, which comprises liquefying the gas under superatmospheric pressure and reducing its temperature to one short of the temperature at which the contaminants that are solidifiable when the gas is in the liquid state solidify; passing the liquefied gas to an expansion chamber operating at a pressure lower than the original pressure of the feed gas to cause a reduction in temperature so that a slurry of solid contaminants in the liquefied gas is formed accompanied by a flash-off of vapour; venting off part of the flashed-off vapour and condensing the remainder thereof by heat-exchange with cold purified liquefied gas and returning it to the slurry in the expansion chamber; passing the slurry of solid contaminants from the expansion chamber to a separator operating at a pressure lower than the expansion chamber, and withdrawing from the separator a concentrated slurry of the solid contaminants; venting cold vapour from the separator and passing cold purified liquefied gas from the separator to the said heat exchange step with part of the vapour flashed-off in the expansion chamber and then taking it off as product.

The vapour vented from the expansion chamber or chambers is preferably used to assist in cooling the incoming feedstock gas before it is removed from the system. In the case where vapours are vented from two or more expansion chambers, the vapours from all but the last expansion chamber may be vented through expansion valves to obtain vapours at the pressure of the vapour of the last expansion chamber; and the vapours, including vapour vented directly from the last expansion chamber, may then be mixed and used to assist in cooling the incoming feedstock gas before they are removed from the system.

When processing a hydrogen sulphide rich natural gas containing nitrogen and separating the two liquid phases referred to above before passing to the expansion chamber or chambers, the concentrated slurry of solid hydrogen sulphide, (which may contain solid carbon dioxide) in methane removed from the separator may be returned to the decanter in which the two liquid phases are separated. This assists in preserving the refrigeration potential of the concentrated slurry.

The hydrogen sulphide rich liquid phase which is drawn off from the decanter in which the two liquid phases are separated may be treated to recover the small amount of methane present in the phase, usually about 10%. A simple manner of achieving this is to reduce the pressure on the hydrogen sulphide rich liquid phase down to about atmospheric pressure, when the methane and any nitrogen present will flash off to leave a slurry of substantially pure solid hydrogen sulphide (with perhaps some solid carbon dioxide) in liquid hydrogen sulphide. The methane and nitrogen flashed off may, if desired, be mixed with the vapours (which contain a substantial amount of methane) vented from the expansion chamber or chambers; and the mixture obtained may be used to assist in cooling the incoming natural gas feedstock before being removed from the system. When the slurry from the separator is returned to the decanter in which the two liquid phases are separated, the resultant slurry of solid hydrogen sulphide in liquid hydrogen sulphide will comprise the hydrogen sulphide effluent of the process and can be sent, for example, to a sulphur recovery unit.

The invention will now be described with reference to the accompanying drawing which illustrates a method of removing hydrogen sulphide from natural gas. Natural gas containing 25 mol percent of hydrogen sulphide enters the plant under a pressure of about 125 kg./cm.$^2$ and at ambient temperature through conduit 1 and passes through expansion turbine 2 in which it is expanded to about 55 kg./cm.$^2$ and with a resultant drop in temperature. It then passes via conduit 3 through heat exchanger 4 and expansion valve 5 into the decanter 6 by which time its temperature is minus 90 degrees centigrade and it is wholly liquefied. In decanter 6, the liquefied gas separates into two layers, the top layer containing 6.5 mol percent hydrogen sulphide and the bottom layer containing 89 mol percent hydrogen sulphide. The top layer leaves decanter 6 through line 7 and passes through expansion valve 8 into expansion chamber 9 in which the temperature is minus 95 degrees centigrade.

In expansion chamber 9 the vapor which is flashed off as a result of the drop in pressure on passing through expansion valve 8 is condensed by the heat exchanger tubes 10 in the upper part of the expansion chamber and drops back into the liquid collecting in the bottom of the expansion chamber. The drop in temperature in expansion chamber 9 as compared with decanter 6 is sufficient to cause some of the hydrogen sulphide to solidify and form a slurry in the liquid methane. This slurry leaves expansion chamber 9 via conduit 11 and, after passing through expansion valve 12, enters the next expansion chamber 13. The same process is repeated in expansion chambers 13, 14, 15, 16, 17 and 18, the temperature in which is minus 101° C.; minus 107° C.; minus 112° C.; minus 118° C.; minus 123° C. and minus 129° C., respectively. As the temperature is reduced in each expansion chamber, more and more of the hydrogen sulphide is precipitated as solid.

The slurry of solid hydrogen sulphide in liquid methane collecting in the base of expansion chamber 18 leaves that expansion chamber via line 19 and, after passing through expansion valve 20, enters the separator 21 in which the temperature is about minus 143° C. This final reduction in pressure and temperature causes some methane to flash off and this leaves the separator via conduit 22, passes through heat exchangers 23 and 4 and is finally compressed in compressor 24 to form part of the stream of purified gas. Compressor 24 may be driven by turbine 2. The cold vapour leaving separator 21 at minus 143° C. is used in heat exchanger 23 to cool liquid methane which has been used to condense the vapours evolved in the expansion chambers, as will be described in more detail hereinafter. In heat exchanger 4, the gas is used to cool the incoming feed.

In separator 21, the solid hydrogen sulphide settles out of the liquid phase. The pure liquid methane is taken off via conduit 25 and pumped by pump 26 through conduit 27 at a pressure of 32 kg./cm.$^2$. This cold liquid is then passed through heat exchanger tubes 10 in each of the expansion chambers, in which tubes it serves to cool the vapours given off in these expansion chambers. It leaves the heat exchanger tubes of expansion chamber 9 at minus 98° C. and is then pressurized in pump 28 to a pressure of 53 kg./cm.$^2$. Part of the liquid is now returned via conduit 29 through heat exchanger 23 in which it is cooled by heat exchange with the cold gases from the separator in conduit 22 and returned to conduit 27 via expansion valve 30. The other part of the pressurized liquid leaving pump 28 passes via conduit 31 through heat exchanger 4 to assist in cooling the incoming feed and then is taken off as a product.

The slurry of solid hydrogen sulphide collecting at the base of separator 21 is taken through the foot of the separator via conduit 32 into slurry pump 33 which pumps the slurry back to decanter 6 via conduit 34. In the decanter, the slurry gives up its refrigeration potential to the liquids therein and distributes itself between the two liquid phases.

The lower hydrogen sulphide-rich liquid layer in decanter 6 leaves the foot of the decanter via conduit 35 and passes through expansion valve 36 into expansion chamber 37 operating at 2 kg./cm.$^2$. In this expansion chamber, methane is flashed off and leaves the chamber via conduit 38 and expansion valve 39 and, after passing through heat exchanger 4, in which it gives up its refrigeration potential to the incoming feed, it can be used as a low pressure fuel gas containing about 3% hydrogen sulphide. In the bottom of expansion chamber 37, there collects a slurry of solid hydrogen sulphide in liquid hydrogen sulphide, and this is taken off via conduit 40 and expansion valve 41 and then passes through heat exchanger 4 in which it gives up its refrigeration potential to the incoming feed and passes to waste or a sulphur recovery unit.

The product from the above-described process is purified natural gas containing only 0.5% hydrogen sulphide at a pressure of 53 kg./cm.$^2$. The process is self-supporting once it is started and requires no external refrigeration.

If the feed to the above-described process was natural gas containing less than 7 mol percent of hydrogen sulphide, then on liquefaction there would be no separation into two liquid phases and there would be no need to use decanter 6. In this case, the liquefied gas leaving heat exchanger 4 in conduit 3 would pass straight to expansion valve 8 and the slurry from separator 21 would pass straight to expansion chamber 37.

In the case that the gas to be purified contains not only contaminants that are solidifiable when the gas is in the liquid state but also contaminants having boiling points below the boiling point of the gas to be purified an additional arrangement as indicated below in the drawings is desirable.

Suppose for example that hydrogen sulphide and nitrogen have to be removed from natural gas. In that case natural gas containing 2 mol percent nitrogen and 25 mol percent of hydrogen sulphide enters for example the plant under a pressure of 125 kg./cm.$^2$ and at ambient temperature through conduit 1 and passes through turbine 2 in which it is expanded to 55 kg./cm.$^2$ and cooled. It then passes via conduit 3 through heat exchanger 4 and expansion valve 5 into decanter 6 by which time its temperature is minus 90° C. and it is wholly liquefied. In decanter 6 the liquefied gas separates into two layers, the top layer containing 6.5 mol percent of hydrogen sulphide and the bottom layer containing 89 mol percent of hydrogen sulphide. The top layer leaves decanter 6 through conduit 7 and passes through expansion valve 8 into expansion chamber 9 in which the temperature is minus 96° C.

In expansion chamber 9, vapour is flashed-off as a result of the drop in pressure. A part of the vapour is condensed by the heat exchanger tubes 10 in the upper part of the expansion chamber, and drops back into the liquid collecting in the bottom of the expansion chamber. The remainder of the vapour, which contains nitrogen, is vented into conduit 42 via valve 43. The drop in temperature in expansion chamber 9 as compared with that in decanter 6 is sufficient to cause some of the hydrogen sulphide to solidify and form a slurry in the liquid methane. This slurry leaves expansion chamber 9 via conduit 11 and, after passing through expansion valve 12, enters expansion chamber 13. The same process is repeated in expansion chambers 13, 14, 15, 16, 17 and 18, the temperature in which is minus 101° C.; minus 107° C.; minus 112° C.; minus 118° C.; minus 123° C. and minus 129° C., respectively. As the temperature is reduced in each expansion chamber, more and more of the hydrogen sulphide is precipitated as solid. Vapours vented from expansion chambers 9, 13, 14, 15, 16 and 17 pass into conduit 42 via valves 43, 44, 45, 46, 47 and 48 as vapours at the pressure of the vapours in expansion chamber 18, the latter being directly connected to the conduit 42. If no nitrogen is present, the valves 43–48 inclusive may be shut off, and if desired, the above system isolated by means of throttle valve 49.

The lower hydrogen sulphide rich liquid layer in decanter 6 leaves the foot of the decanter via conduit 35 and passes through expansion valve 36 into expansion chamber 37 operating at 2 kg./cm.$^2$. In this expansion chamber, methane and nitrogen are flashed off and leave the chamber via conduit 38 and expansion valve 39, and after mixing with methane from conduit 42 and passing through heat exchanger 4, in which the mixture of gases gives up its refrigeration potential to the incoming feed. The mixture of gases can be used as a low pressure fuel gas containing about 3% hydrogen sulphide.

We claim:
1. A method of purifying a gas containing contaminants which will solidify when the gas is in the liquid state which comprises
   (a) liquefying the gas under superatmospheric pressure and reducing its temperature to a temperature above that at which the contaminants solidify,
   (b) passing the liquefied gas to an expansion chamber operating at a pressure lower than the original pressure of the feed gas to cause a reduction in temperature so that a slurry of solid contaminants in the liquefied gas is formed accompanied by a flash-off of vapor,
   (c) condensing the flashed-off vapor by heat exchange with cold purified liquefied gas as mentioned in (e) below and returning the condensed flashed-off vapor to the slurry in the expansion chamber,
   (d) passing the slurry of solid contaminants in liquefied gas from the expansion chamber to a separator operating at a pressure lower than the expansion chamber, in which separator cold purified liquefied gas separates from a concentrated slurry of solid contaminants in liquefied gas,
   (e) passing cold purified liquefied gas from the separator in heat exchange with the flashed-off vapors from the expansion chamber to condense said vapors and then taking the purified liquefied gas off as product and
   (f) withdrawing from the separator a concentrated slurry of the solid contaminants.

2. A method as claimed in claim 1 in which the liquefied gas is passed through at least two expansion chambers in series prior to passing to the separator, each of which expansion chambers operates at a lower pressure than the previous one.

3. A method of purifying natural gas containing 7 mol percent or more of hydrogen sulphide which comprises
   (a) liquefying the gas under superatmospheric pressure and reducing its temperature to one at which two liquid phases are formed, one rich in methane and the other rich in hydrogen sulphide,
   (b) separating the two phases in a first separator and passing the one rich in methane to an expansion chamber operating at a pressure lower than the original pressure of the feed gas to cause a reduction in temperature so that a slurry of solid hydrogen sulphide in the liquefied gas is formed accompanied by a flash-off of vapor.
   (c) condensing the flashed-off vapor by heat exchange with the cold purified liquefied gas as mentioned in (e) below and returning the condensed flashed-off vapor to the slurry in the expansion chamber,
   (d) passing the slurry of solid hydrogen sulphide in liquefied gas from the expansion chamber to a second separator operating at a pressure lower than the expansion chamber in which separator cold purified liquefied gas separates from a concentrated slurry of solid hydrogen sulphide in liquefied gas,
   (e) passing cold purified liquefied gas from the second separator in heat exchange with the flashed-off vapors from the expansion chamber to condense said vapors and then taking the purified liquefied gas off as product and
   (f) withdrawing from the second separator a concentrated slurry of the solid hydrogen sulphide.

4. A method as claimed in claim 3 in which the cold purified liquefied gas, after condensing the flashed-off vapors in the expansion chamber, is used to assist in cooling the feed gas.

5. A method of purifying a gas containing contaminants which will solidify when the gas is in a liquid state and contaminants having boiling points below the boiling point of the gas which comprises.
   (a) liquefying the gas under superatmospheric pressure and reducing its temperature to a temperature above that at which the contaminants which will solidify when the gas is in the liquid state soliditfy,
   (b) passing the liquefied gas to an expansion chamber operating at a pressure lower than the original pressure of the feed gas to cause a reduction in temperature so that a slurry of solid contaminants in the liquefied gas is formed accompanied by a flash-off of vapor,
   (c) venting off part of the flashed-off vapor and condensing the remainder thereof by heat exchange with cold purified liquefied gas as mentioned in (e) below and returning the condensed flashed-off vapor to the slurry in the expansion chamber,
   (d) passing the slurry of solid contaminants in liquefied gas from the expansion chamber to a separator operating at a pressure lower than the expansion chamber, in which separator cold purified liquefied gas separates from a concentrated slurry of solid contaminants in liquefied gas,
   (e) passing cold purified liquefied gas from the separator in heat exchange with the flashed-off vapors from the expansion chamber to condense said vapors and then taking the purified liquefied gas off as product,
   (f) withdrawing from the separator a concentrated slurry of the solid contaminants and
   (g) venting cold vapor from the separator.

6. A method as claimed in claim 5 in which condensation of vapor flashed-off in the expansion chamber takes place within the expansion chamber.

7. A method of purifying natural gas containing nitrogen and 7 mol percent or more of hydrogen sulphide (based on the total hydrocarbons plus hydrogen sulphide) which comprises
   (a) liquefying the gas under superatmospheric pressure and reducing its temperature to one at which two liquid phases are formed, one rich in methane and the other rich in hydrogen sulphide,
   (b) separating the two phases in a first separator and passing the one rich in methane to an expansion chamber operating at a pressure lower than the original pressure of the feed gas to cause a reduction in temperature so that a slurry of solid hydrogen sulphide in the liquefied gas is formed accompanied by a flash-off of vapor,
   (c) venting off part of the flashed-off vapor and condensing the remainder thereof by heat exchange with cold purified liquefied gas and returning it to the slurry in the expansion chamber,
   (d) passing the slurry of solid hydrogen sulphide from the expansion chamber to a second separator operating at a pressure lower than the expansion chamber in which separator cold purified liquefied gas separates from a concentrated slurry of hydrogen sulphide in liquefied gas,
   (e) passing cold purified liquefied gas from the second separator in heat exchange with part of the vapor flashed-off in the expansion chamber to condense said vapors and then taking the purified liquefied gas off as product,
   (f) withdrawing from the second separator a concentrated slurry of solid hydrogen sulphide, and
   (g) venting cold vapor from the second separator.

8. A method as claimed in claim 7 in which the cold purified liquefied gas, after condensing the flashed-off vapors in the expansion chamber, is used to assist in cooling the feed gas.

9. A method of purifying natural gas containing 7 mol percent or more of hydrogen sulphide which comprises
   (a) liquefying the gas under superatmospheric pressure and reducing its temperature to one at which two liquid phases are formed, one rich in methane and the other rich in hydrogen sulphide,
   (b) separating the two phases in a first separator and passing the one rich in methane to an expansion chamber operating at a pressure lower than the original pressure of the feed gas to cause a reduction in temperature so that a slurry of solid hydrogen sulphide in the liquefied gas is formed accompanied by a flash-off of vapor,
   (c) condensing the flashed-off vapor by heat exchange with cold purified liquefied gas as mentioned in (e) below and returning the condensed flashed-off vapor to the slurry in the expansion chamber,
   (d) passing the slurry of solid hydrogen sulphide in liquefied gas from the expansion chamber to a second separator operating at a pressure lower than the expansion chamber in which separator cold purified liquefied gas separates from a concentrated slurry of solid hydrogen sulphide in liquefied gas,
   (e) passing cold purified liquefied gas from the second separator in heat exchange with the flashed-off vapors from the expansion chamber to condense said vapors and then taking the purified liquefied gas off as product,
   (f) withdrawing from the second separator a concentrated slurry of the solid hydrogen sulphide, and returning it to the first separator.

10. A method of purifying natural gas containing 7 mol percent or more of hydrogen sulphide which comprises
    (a) liquefying the gas under superatmospheric pressure and reducing its temperature to one at which two liquid phases are formed, one rich in methane and the other rich in hydrogen sulphide,
    (b) separating the two phases in a first separator and passing the one rich in methane to an expansion chamber operating at a pressure lower than the original pressure of the feed gas to cause a reduction in temperature so that a slurry of solid hydrogen sulphide in the liquefied gas is formed accompanied by a flash-off of vapor, (c) condensing the flashed-off vapor by heat exchange with cold purified liquefied gas as mentioned in (e) below and returning the condensed flashed-off vapor to the slurry in the expansion chamber, (d) passing the slurry of solid hydrogen sulphide in liquefied gas from the expansion chamber to a second separator operating at a pressure lower than the expansion chamber in which separator cold purified liquefied gas separates from a concentrated slurry of solid hydrogen sulphide in liquefied gas, (e) passing cold purified liquefied gas from the second separator in heat exchanged with the flashed-off vapors from the expansion chamber to condense said vapors and then taking the purified liquefied gas off as product, (f) withdrawing from the second separator a concentrated slurry of the solid hydrogen sulphide, (g) reducing the pressure on the liquid phase rich in hydrogen sulphide, after separation from the liquid phases rich in methane, to flash-off methane and leave a slurry of substantially pure solid hydrogen sulphide in liquid hydrogen sulphide.

11. A method of purifying natural gas containing 7 mol percent or more of hydrogen sulphide which comprises (a) liquefying the gas under superatmospheric pressure and reducing its temperature to one at which two liquid phases are formed, one rich in methane and the other rich in hydrogen sulphide, (b) separating the two phases in a first separator and passing the one rich in methane to an expansion chamber operating at a pressure lower than the original pressure of the feed gas to cause a reduction in temperature so that a slurry of solid hydrogen sulphide in the liquefied gas is formed accompanied by a flash-off of vapor, (c) condensing the flashed-off vapor by heat exchange with cold purified liquefied gas as mentioned in (e) below and returning the condensed flashed-off vapor to the slurry in the expansion chamber, (d) passing the slurry of solid hydrogen sulphide in liquefied gas from the expansion chamber to a second separator operating at a pressure lower than the expansion chamber in which separator cold purified liquefied gas separates from a concentrated slurry of solid hydrogen sulphide in liquefied gas, (e) passing cold purified liquefied gas from the second separator in heat exchange with the flashed-off vapors from the expansion chamber to condense said vapors and then taking the purified liquefied gas off as product, (f) withdrawing from the second separator a concentrated slurry of the solid hydrogen sulphide, (g) compressing part of the cold purified liquefied gas, after condensing the flashed vapors in the expansion chamber, cooling said part by heat exchange with cold gas drawn from the second separator and recycling said part to the stream of cold purified liquefied gas leaving said second separator.

12. A method of purifying natural gas containing nitrogen and 7 mol percent or more of hydrogen sulphide (based on the total hydrocarbons plus hydrogen sulphide) which comprises (a) liquefying the gas under superatmospheric pressure and reducing its temperature to one at which two liquid phases are formed, one rich in methane and the other rich in hydrogen sulphide, (b) separating the two phases in a first separator and passing the one rich in methane to an expansion chamber operating at a pressure lower than the original pressure of the feed gas to cause a reduction in temperature so that slurry of solid hydrogen sulphide in the liquefied gas is formed accompanied by a flash-off of vapor, (c) venting off part of the flash-off vapor and condensing the remainder thereof by heat exchange with cold purified liquefied gas and returning it to the slurry in the expansion chamber, (d) passing the slurry of solid hydrogen sulphide from the expansion chamber to a second separator operating at a pressure lower than the expansion chamber in which separator cold purified liquefied gas separates from a concentrated slurry of hydrogen sulphide in liquefied gas, (e) passing cold purified liquefied gas from the second separator in heat exchange with part of the vapor flashed-off in the expansion chamber to condense said vapors and then taking the purified liquefied gas off as product, (f) withdrawing from the second separator a concentrated slurry of solid hydrogen sulphide, (g) venting cold vapor from the second separator, (h) returning to the first separator the slurry of hydrogen sulphide withdrawn from the second separator.

References Cited by the Examiner

UNITED STATES PATENTS

| Re. 25,193 | 7/1962 | Schilling | 62—14 X |
| 1,913,805 | 6/1933 | Hausen | 62—23 X |
| 2,082,189 | 6/1937 | Twomey | 62—40 X |
| 2,690,989 | 10/1954 | Bottenberg. | |
| 2,900,797 | 8/1959 | Kurata | 62—12 |
| 2,901,326 | 8/1959 | Kurata | 612—12 X |

FOREIGN PATENTS 1,044,127  11/1958  Germany.

NORMAN YUDKOFF, *Primary Examiner.*
ROBERT A. O'LEARY, *Examiner.*